(12) United States Patent
Amamori (10) Patent No.: US 9,016,719 B2
(45) Date of Patent: Apr. 28, 2015

(54) MOUNTING STRUCTURE OF DRIVER AIRBAG UNIT, AND STEERING WHEEL

(75) Inventor: Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/233,244

(22) PCT Filed: Jul. 2, 2012

(86) PCT No.: PCT/JP2012/066851
§ 371 (c)(1),
(2), (4) Date: Jan. 16, 2014

(87) PCT Pub. No.: WO2013/027493
PCT Pub. Date: Feb. 28, 2013

(65) Prior Publication Data
US 2014/0145420 A1 May 29, 2014

(30) Foreign Application Priority Data

Aug. 24, 2011 (JP) ................................. 2011-182747

(51) Int. Cl.
*B60R 21/203* (2006.01)
*B60R 21/217* (2011.01)
*B60Q 5/00* (2006.01)

(52) U.S. Cl.
CPC .............. *B60R 21/203* (2013.01); *B60Q 5/003* (2013.01); *B60R 2021/2173* (2013.01); *B60R 21/2037* (2013.01)

(58) Field of Classification Search
CPC ............ B60R 21/2037; B60R 21/2035; B60R 21/203; B60R 2021/2173; B60Q 5/003
USPC ................. 280/731, 728.2; 200/61.54, 61.55, 200/61.56, 61.57
See application file for complete search history.

(56) References Cited

U.S. PATENT DOCUMENTS

| | | | | |
|---|---|---|---|---|
| 5,738,369 A | * | 4/1998 | Durrani | 280/731 |
| 6,036,223 A | * | 3/2000 | Worrell et al. | 280/731 |
| 6,086,090 A | * | 7/2000 | Fischer | 280/728.2 |
| 6,592,141 B1 | * | 7/2003 | Dancasius et al. | 280/728.2 |
| 8,608,194 B2 | * | 12/2013 | Marotzke | 280/731 |
| 2002/0125698 A1 | * | 9/2002 | Schutz | 280/731 |
| 2004/0090052 A1 | | 5/2004 | Sugimoto | |
| 2005/0062269 A1 | * | 3/2005 | Amamori | 280/731 |
| 2005/0236820 A1 | * | 10/2005 | Amamori | 280/731 |
| 2009/0218739 A1 | | 9/2009 | Terada et al. | |
| 2010/0038890 A1 | * | 2/2010 | Andersson et al. | 280/731 |
| 2010/0219621 A1 | | 9/2010 | Sasaki et al. | |

FOREIGN PATENT DOCUMENTS

| | | | | |
|---|---|---|---|---|
| DE | 10100257 A1 | * | 7/2002 | B60Q 5/00 |
| JP | H04-169357 A | | 6/1992 | |

(Continued)

*Primary Examiner* — Keith Frisby
(74) *Attorney, Agent, or Firm* — Manabu Kanesaka (57) ABSTRACT

Provided are a mounting structure of driver airbag unit and a steering wheel of a simple structure, but which allow the driver airbag unit to be easily mounted on the steering wheel so as to slightly move. A driver airbag unit 20 is mounted on the steering wheel 1 so as to move toward and away from the driver, and biased toward the driver by coil springs 60. The driver airbag unit 20 is mounted on the steering wheel 1 by connection of leg members 40, projecting from a retainer 30 in a direction away from the driver, to the steering wheel 1. The leg members 40 are allowed to slightly move with respect to the retainer 30 at least away from and toward the driver.

5 Claims, 7 Drawing Sheets

(56) References Cited

FOREIGN PATENT DOCUMENTS

| | | |
|---|---|---|
| JP | H05-116581 A | 5/1993 |
| JP | H09-183352 A | 7/1997 |
| JP | 2001-063588 A | 3/2001 |
| JP | 2001-206184 A | 7/2001 |
| JP | 2001-278064 A | 10/2001 |
| JP | 2002-002431 A | 1/2002 |
| JP | 2004-168284 A | 6/2004 |
| JP | 2006-218903 A | 8/2006 |
| JP | 2009-202859 A | 9/2009 |
| JP | 2010-201949 A | 9/2010 |
| JP | 2012-111325 A | 6/2012 |

* cited by examiner

MOUNTING STRUCTURE OF DRIVER AIRBAG UNIT, AND STEERING WHEEL

RELATED APPLICATIONS

The present application is National Phase of International Application No. PCT/JP2012/066851 filed Jul. 2, 2012, and claims priority from Japanese Application No. 2011-182747 filed Aug. 24, 2011.

TECHNICAL FIELD

The present invention relates to a mounting structure of driver airbag unit used for mounting a driver airbag unit on the driver-side face of a steering wheel, and, more particularly to a mounting structure of driver airbag unit in which the airbag unit also serves as a horn switch that turns on a horn upon being pressed from the side of the driver and displaced away from the driver. The present invention also relates to a steering wheel coupled with a driver airbag unit via the mounting structure of driver airbag unit.

BACKGROUND ART

Steering wheels with driver airbag unit thus far developed include those to which the driver airbag unit is mounted on the driver-side face of the steering wheel, and configured to activate (blow) a horn when the driver airbag unit is pressed from the side of the driver and displaced away from the driver.

Patent Literature 1 (PTL 1: Japanese Unexamined Patent Application Publication No. 2006-218903) discloses a structure including a base plate that supports a driver airbag unit so as to move toward and away from the driver, the base plate being attached to the driver airbag unit on the opposite side of the driver, and attached to the steering wheel.

The driver airbag unit includes an airbag, an inflator for expanding the airbag, a retainer on which the airbag and the inflator are attached, and a module cover attached to the driver-side face of the retainer, so as to cover the folded body of the airbag. According to PTL 1, the retainer includes a guide shaft projecting from the retainer in a direction away from the driver. The base plate includes a guide shaft insertion hole, through which the guide shaft insertion hole is inserted so as to move toward and away from the driver. A flange larger in diameter than the guide shaft insertion hole is provided on an end portion of the guide shaft, to delimit the movement of the retainer away from the base plate. Coil springs are provided around the guide shaft, with an end portion abutted to the retainer and the other end portion abutted to the base plate. Accordingly, the driver airbag unit is biased toward the driver by the coil spring.

The base plate includes a bracket projecting in the direction away from the driver from the face of the base plate opposite to the driver, and upon connecting the bracket to the steering wheel the driver airbag unit is attached to the steering wheel via the base plate so as to move toward and away from the driver. A fixed contact of the horn switch is provided on the base plate, and a movable contact of the horn switch is provided on the retainer.

When the driver airbag unit is pressed from the side of the driver, the driver airbag unit is displaced toward the base plate along the guide shaft, and the movable contact on the side of the driver airbag unit is brought into contact with the fixed contact on the base plate, so that the horn is activated.

CITATION LIST

Patent Literature

PTL 1: Japanese Unexamined Patent Application Publication No. 2006-218903

SUMMARY OF INVENTION

Technical Problem

In the mounting structure of driver airbag unit according to PTL 1, the driver airbag unit is joined to the base plate so as to move toward and away from the driver via the guide shaft, and the base plate is attached to the steering wheel via the bracket. Such a configuration is rather complicated, and therefore the mounting work of the driver airbag unit on the steering wheel may become troublesome.

Accordingly, the present invention provides a mounting structure of driver airbag unit of a simplified configuration that allows the driver airbag unit to be attached to a steering wheel so as to slightly move with respect thereto, and a steering wheel coupled with a driver airbag unit via such a mounting structure of driver airbag unit.

Solution to Problem

In a first aspect, the present invention provides a mounting structure of driver airbag unit in which the driver airbag unit is attached to a steering wheel so as to move at least toward and away from the driver, the airbag unit is biased toward the driver by a biasing member, and an electric circuit is operated when the driver airbag unit is pressed by the driver and displaced away from the driver. The driver airbag unit includes an airbag, an inflator for expanding the airbag, a retainer to which the airbag and the inflator are attached, and a module cover attached to the driver-side face of the retainer, so as to cover the folded body of the airbag. The mounting structure of driver airbag unit, in which the retainer is attached to the steering wheel so as to move at least toward and away from the driver, includes a leg member projecting from the retainer in a direction away from the driver, the leg member being movable at least away from and toward the driver with respect to the retainer and connected to the steering wheel.

In a mounting structure of driver airbag unit according to a second aspect, the leg member may be formed separately from the retainer, and inserted from the side of the driver through a leg insertion hole formed in the retainer, so as to move away from and toward the driver.

In a mounting structure of driver airbag unit according to a third aspect, the leg member may include a main leg portion inserted through the leg insertion hole and a stopper portion protruding in a lateral direction from a face of the main leg portion on the side of the driver, and the stopper portion restricts the retainer from moving farther away from the steering wheel, upon being abutted to the retainer from the side of the driver.

In a fourth aspect, the steering wheel may be coupled with the driver airbag unit via the mounting structure of driver airbag unit according to one of the first to the third aspects.

Advantageous Effects of Invention

In the mounting structure of driver airbag unit according to the first aspect, the leg member itself, projecting from the retainer of the driver airbag unit in the direction away from the driver and connected to the steering wheel, is set to move away from and toward the driver with respect to the retainer. Accordingly, the driver airbag unit can be mounted on the steering wheel so as to move toward and away from the driver, simply by connecting the leg member directly to the steering wheel. Such a configuration eliminates the need to connect, as in the conventional technique, the driver airbag unit to the base plate so as to move toward and away from the driver via the guide shaft, and to attach the base plate to the steering wheel, thereby simplifying the mounting structure that allows the driver airbag unit to slightly move with respect to the steering wheel.

With the configuration according to the second aspect, the leg member can be attached to the retainer so as to move away from and toward the driver, with a simple structure.

With the configuration according to the third aspect, a distance between the driver airbag unit and the steering wheel in the state where the driver airbag unit is free from a pressure can be securely delimited with a simple structure. Further, even though the retainer is subjected to a load of the airbag attracting the retainer toward the driver when the airbag expands, the leg member securely keeps the retainer attached to the steering wheel.

The steering wheel according to the fourth aspect is coupled with the driver airbag unit via the foregoing mounting structure of driver airbag unit, and therefore the structure of the steering wheel with the driver airbag unit can be simplified.

DESCRIPTION OF EMBODIMENTS

Hereafter, an embodiment of the present invention will be described with reference to the drawings. Although a steering wheel and a driver airbag unit according to the following embodiment are intended for use in a car, the steering wheel and the driver airbag unit may be installed in a vehicle other than a car. In the description given below, an up-down direction and a left-right direction of the steering wheel respectively refer to the up-down direction and the left-right direction of the steering wheel seen from the front (from the extension of the steering shaft toward the driver), with the steering wheel set at the angle for running straight ahead.

Figure 1:
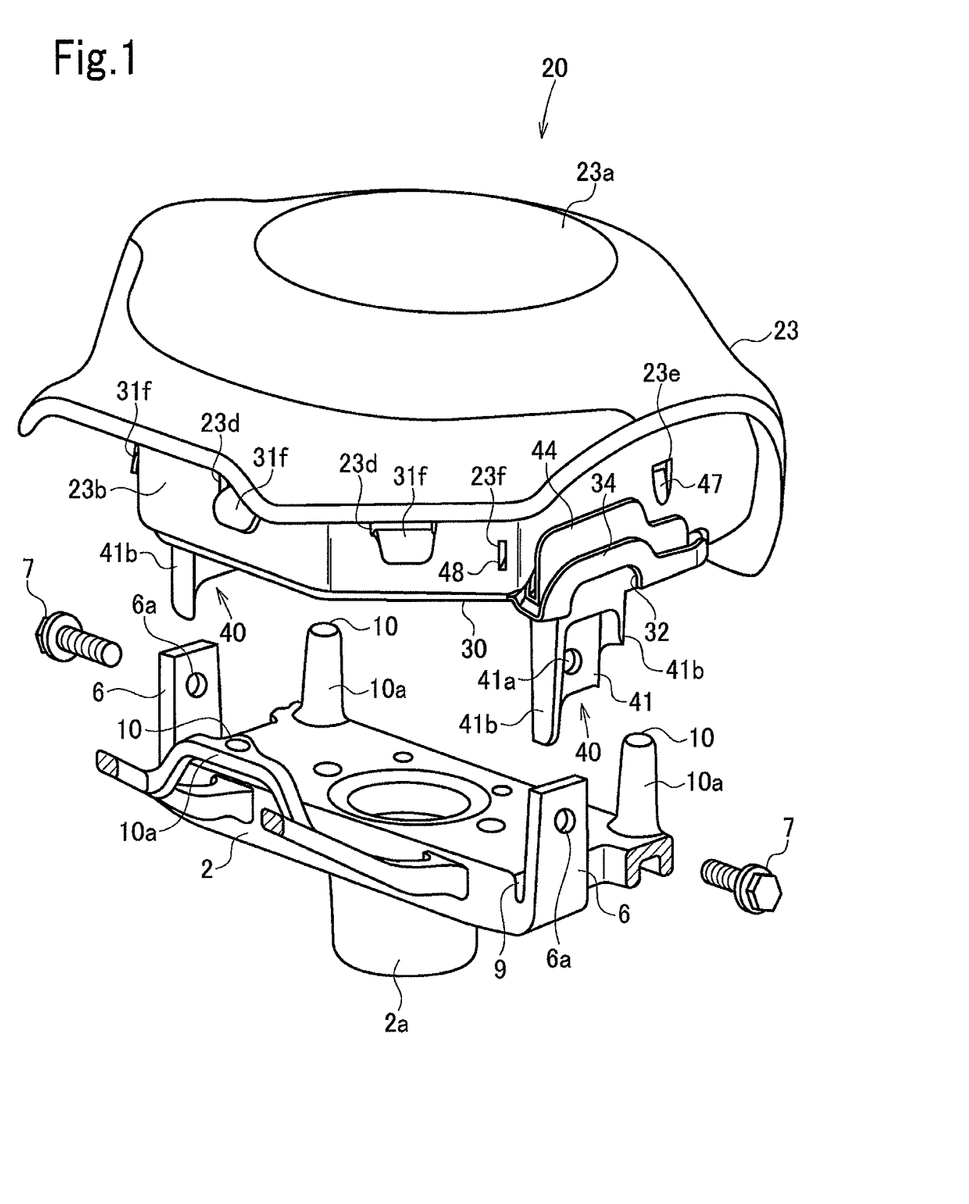
FIG. 1 is an explode perspective view showing a mounting structure of driver airbag unit according to an embodiment.
Figure 2:
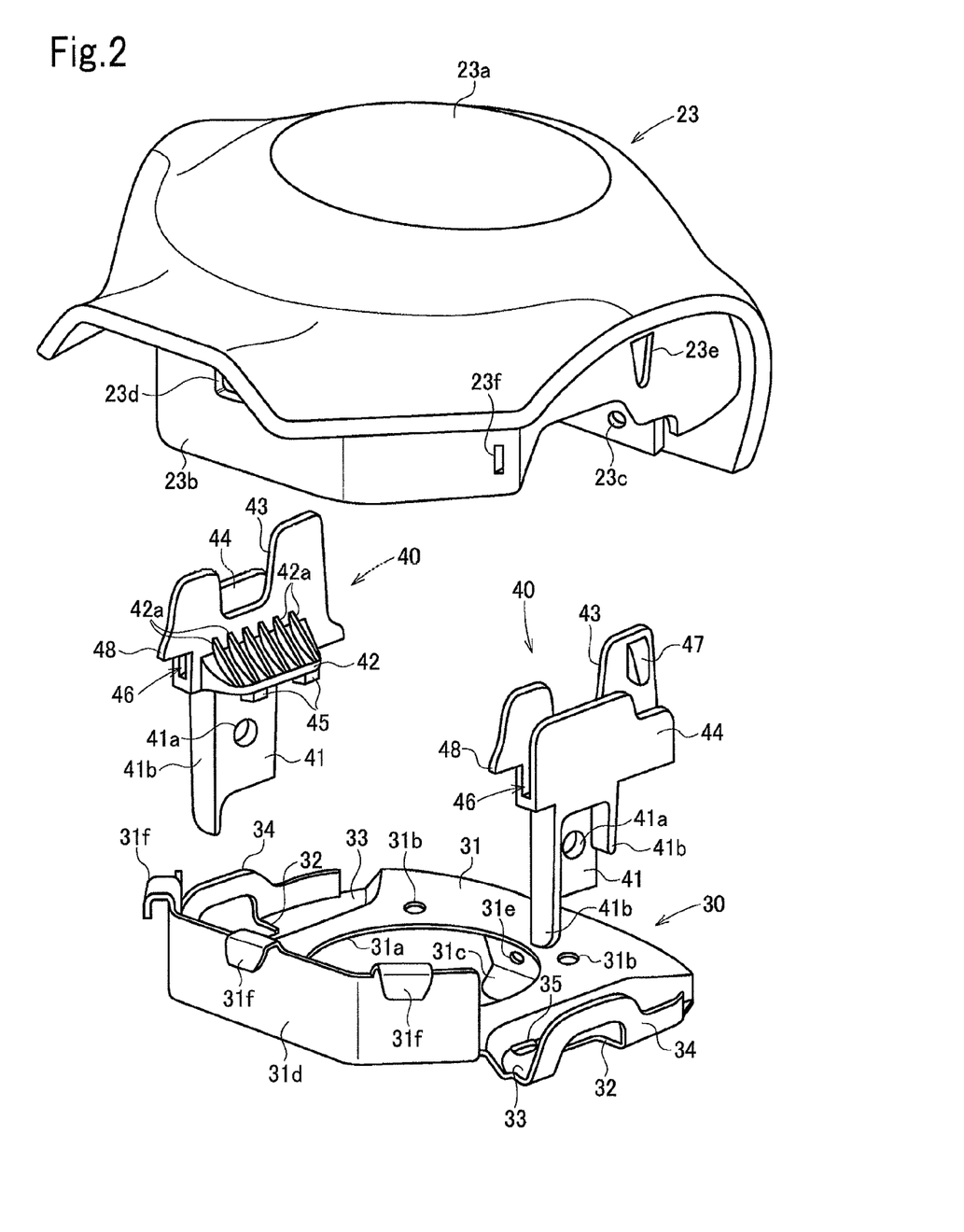
FIG. 2 is an exploded perspective view showing the driver airbag unit shown in FIG. 1.
Figure 3:
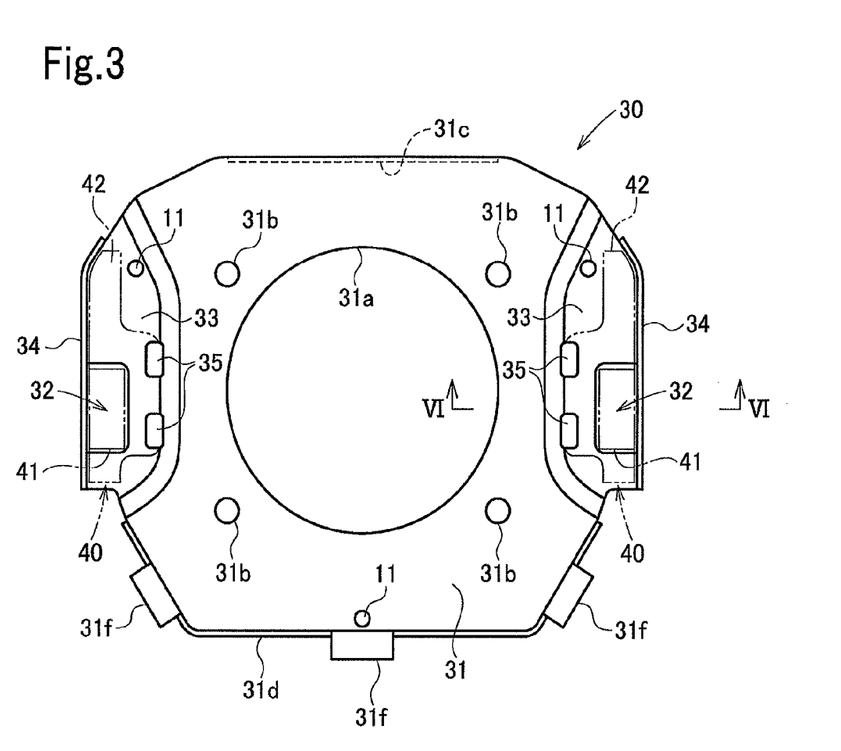
FIG. 3 is a front view of a retainer of the driver airbag unit shown in FIG. 1.
Figure 4:
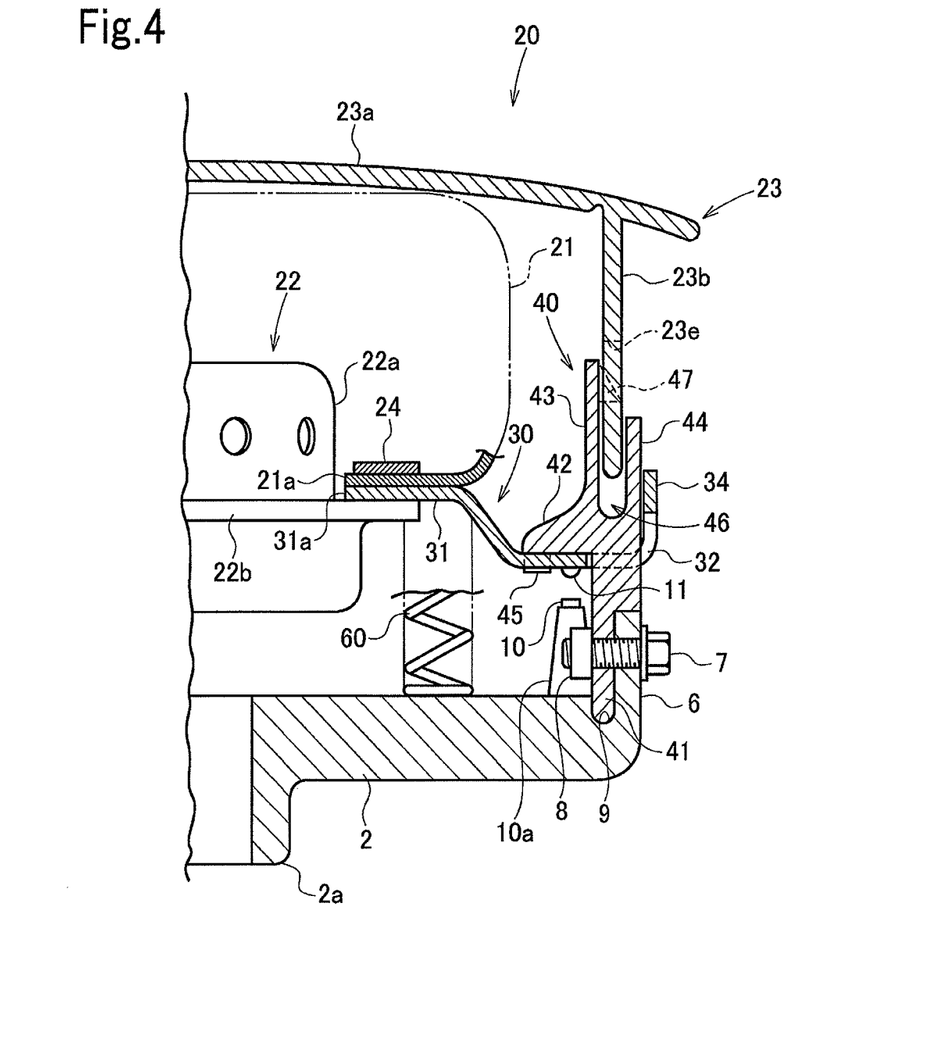
FIG. 4 is a fragmentary cross-sectional view of the mounting structure of driver airbag unit shown in FIG. 1.
Figure 5:
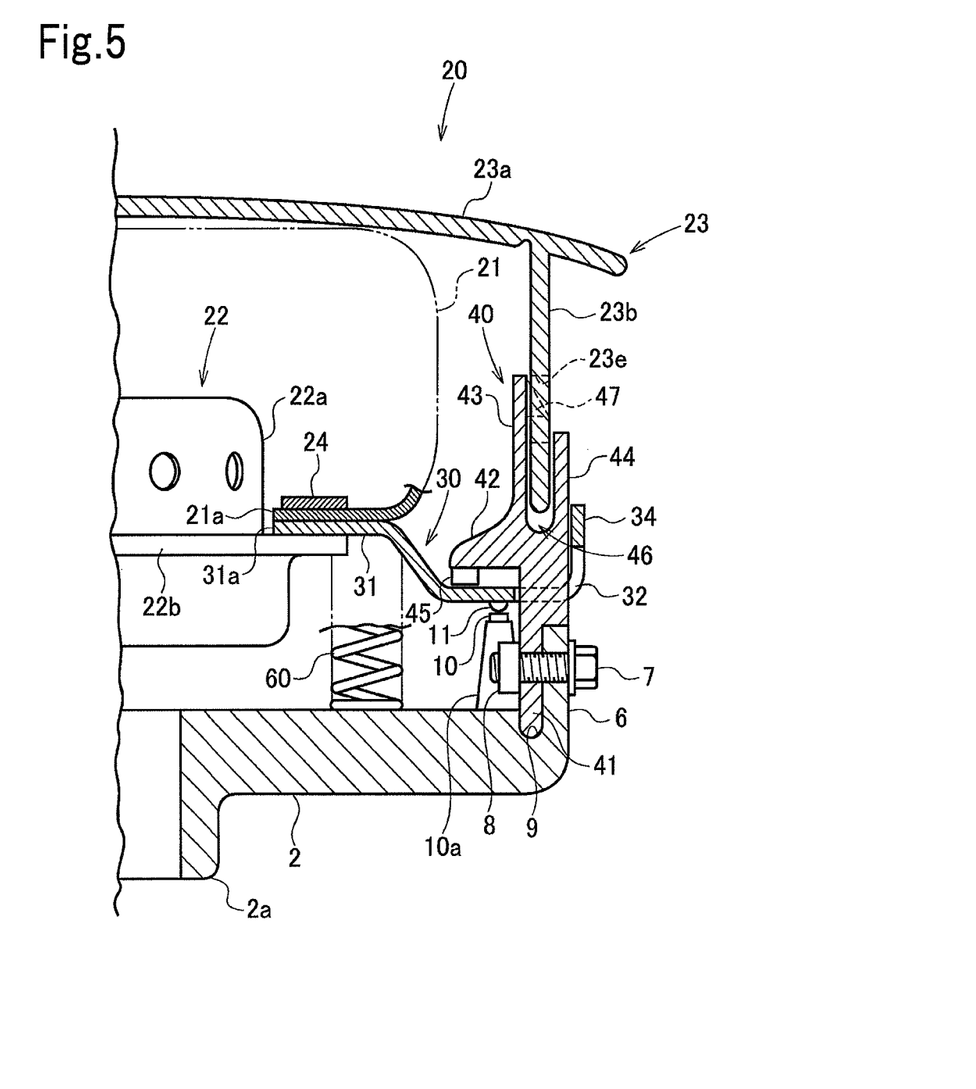
FIG. 5 is a fragmentary cross-sectional view showing the same section as FIG. 4, in which the driver airbag unit is displaced away from the driver.
Figure 6:
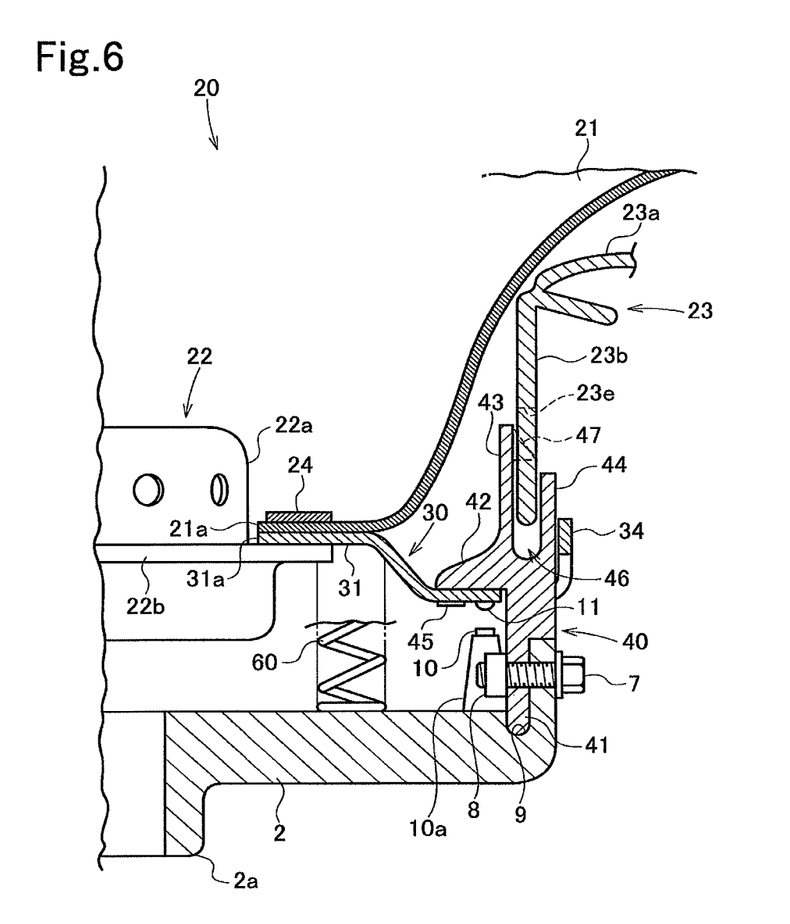
FIG. 6 is a fragmentary cross-sectional view showing the same section as FIG. 4, in which the airbag has expanded.
Figure 7:
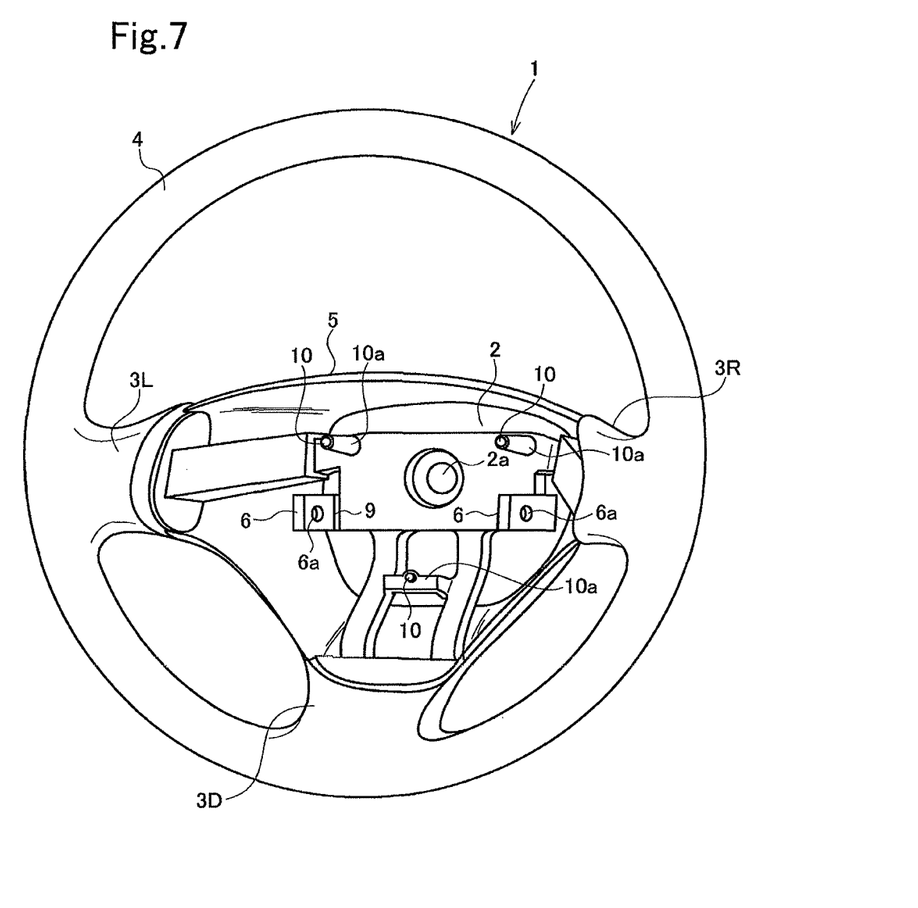
FIG. 7 is a perspective view showing a steering wheel on which the driver airbag unit shown in FIG. 1 is mounted.

FIG. 1 is an explode perspective view showing a mounting structure of driver airbag unit according to the embodiment. FIG. 2 is an exploded perspective view showing the driver airbag unit. In FIG. 2, the airbag and an inflator are not shown. FIG. 3 is a front view of a retainer of the driver airbag unit. FIG. 4 is a cross-sectional view taken along a line IV-IV in FIG. 3, showing a part of the mounting structure of driver airbag unit. FIG. 5 is a cross-sectional view taken in the same way as FIG. 4, showing a state where the driver airbag unit is displaced away from the driver. FIG. 6 is a cross-sectional view taken in the same way as FIG. 4, showing a state where the airbag has expanded. FIG. 7 is a perspective view showing a steering wheel on which the driver airbag unit is mounted. In FIGS. 1, 2, and 4 to 6, the direction from the driver to the opposite side across the steering wheel is oriented in the vertical direction, for the sake of visual clarity.

<Configuration of Steering Wheel>

As shown in FIG. 7, the steering wheel 1 according to this embodiment is what is known as a three-spoke steering wheel, including spokes 3L, 3R, and 3D respectively extending in three directions from a steering hub portion 2 located at the central portion of the steering wheel, namely to the left and right (direction of 3 o'clock and 9 o'clock) and downward (direction of 6 o'clock), and the distal end portion of each of the spokes 3L, 3R, 3D is connected to a ring portion 4 constituting the outer periphery of the steering wheel 1. Naturally, the number and location of the spokes provided in the steering wheel 1 are not limited to the mentioned configuration. The steering hub portion 2 is connected to an end portion of a steering shaft (not shown) of the vehicle. Reference numeral 2a designates a boss in which the steering shaft is fitted. A back cover 5 is attached to the steering hub portion 2 so as to cover the face thereof opposite to the driver. A driver airbag unit (hereinafter, simply "airbag unit" as the case may be) 20 is attached to the driver-side face of the steering hub portion 2.

Brackets 6 for mounting the airbag unit are provided on the steering hub portion 2 so as to protrude toward the driver. In this embodiment, a pair of brackets are respectively located on the left and the right across the center of the steering wheel (boss 2a), as shown in FIG. 7. In this embodiment, the brackets 6 each include a bolt orifice 6a, and a leg member 40 (described later) of the airbag unit 20 is connected to the bracket 6 with a bolt 7 passed through the bolt orifice 6a and a nut 8 (see FIGS. 4 to 6). The bolt orifice 6a is formed so as to penetrate through the bracket 6 in the left-right direction. Naturally, the number and location of the brackets 6, and the connection method of the leg member 40 to the bracket 6 are not limited to the mentioned configuration.

Leg member fitting grooves 9, recessed in the direction away from the driver, are formed along the surfaces of the respective brackets 6 on the side of the center of the steering wheel. The leg member fitting grooves 9 are respectively located adjacent to the right surface of the left bracket 6 and adjacent to the left surface of the right bracket 6. As shown in FIGS. 4 to 6, the inner wall of the leg member fitting groove 9 on the side of the bracket 6 is flush with, i.e., continuously connected to the surface of the bracket 6 on the side of the center of the steering wheel (right surface of left bracket 6 and left surface of right bracket 6), so as to allow the leg member 40 of the airbag unit 20 to be guided along the surfaces of the bracket 6 on the side of the center of the steering wheel, thus to be smoothly fitted in the leg member fitting groove 9.

Steering wheel-side contacts (fixed contact) 10 each constituting a switch of an electric circuit are located on the left and right sides of and under the steering hub portion 2, respectively. In embodiment, contact support bases 10a are respectively formed on the left and right sides of and under the steering hub portion 2, so as to project toward the driver from the steering hub portion 2 or core metals of the spokes 3L, 3R, 3D, and the steering wheel-side contacts 10 are located on top of the respective contact support bases 10a. Naturally, the number, location, and formation method of the steering wheel-side contacts 10 are not limited to the mentioned configuration.

<Configuration of Airbag Unit 20>

The airbag unit 20 is mounted on the driver-side face of the steering hub portion 2 of the steering wheel 1. The airbag unit 20 also serves as a switch of the electric circuit, and is configured to be displaced away from the driver when pressed from the side of the driver, to thereby operate the electric circuit. Examples of the electric circuit include a horn activating (blowing) circuit, but are not limited thereto.

The airbag unit 20 includes an airbag 21, an inflator 22 for expanding the airbag 21, a retainer 30 to which the airbag 21 and the inflator 22 are attached, a module cover 23 attached to the driver-side face of the retainer 30, so as to cover the folded body of the airbag 21, leg members 40 projecting from the retainer 30 in the direction away from the driver and respectively connected to the brackets 6 of the steering wheel 1, and coil springs 60 each serving as the biasing member that biases the retainer 30 toward the driver. The leg members 40 are made to move at least away from and toward the driver, with respect to the retainer 30.

The retainer 30 includes a main plate portion 31 opposed to the driver-side face of the steering hub portion 2. As shown in FIGS. 2 and 3, an inflator opening 31a in which the inflator 22 is fitted is provided in a region around the center of the main plate portion 31, and bolt orifices 31b for passing a bolt (not shown) for fixing the airbag 21 and the inflator 22 to the main plate portion 31 are provided along the periphery of the inflator opening 31a. In this embodiment, the retainer 30 includes joint lugs 31c, 31d via which the module cover 23 is attached to the retainer 30, respectively projecting form an upper edge and a lower edge of the main plate portion 31. The joint lug 31c includes a rivet orifice 31e, and the joint lug 31d includes a hook 31f.

In this embodiment, the module cover 23 includes a main surface portion 23a that covers the driver-side face of the folded body of the airbag 21, and a wall portion 23b projecting from the main surface portion 23a in the direction away from the driver. The wall portion 23b is formed so as to surround the upper, lower, left, and right sides of the folded body of the airbag 21. The wall portion 23b includes rivet orifices 23c (see FIG. 2) located in an upper portion thereof, and a hook engaging slot 23d in a lower portion. The module cover 23 is placed such that the wall portion 23b surrounds the outer periphery of the main plate portion 31 of the retainer 30, and the lower end portion of the wall portion 23b is engaged with the hook 31f of the retainer 30 via the hook engaging slot 23d and the upper end portion of the wall portion 23b is fixed to the joint lug 31c of the retainer 30 with rivets (not shown) passed through the rivet orifices 23c, 31e. Naturally, the joint structure between the module cover 23 and the retainer 30 is not limited to the mentioned configuration.

The leg members 40 are respectively provided on the left and right end portions of the main plate portion 31 of the retainer 30, so as to oppose the brackets 6 of the steering hub portion 2. The leg members 40 are formed separately from the retainer 30. In this embodiment, the main plate portion 31 includes leg insertion holes 32 respectively formed on the left and right end portions, and the leg members 40 are inserted through the respective leg insertion holes 32 so as to move away from and toward the driver. In this embodiment, the leg members 40 are made of a synthetic resin from the viewpoint of insulation and formability. It is preferable to employ a synthetic resin based on a hard and impact-resistant material, typically exemplified by nylon. Naturally, the material of the leg member 40 is not limited to such synthetic resins.

In this embodiment, the retainer 30 includes recessed stepped portions 33, formed around the respective leg insertion holes 32 on the left and right end portions of the main plate portion 31 and recessed in the direction away from the driver with respect to the periphery of the inflator opening 31a. The retainer 30 also includes guide lugs 34 for guiding the movement of the leg member 40, projecting toward the driver from the left edge of the left recessed stepped portion 33 and the right edge of the right recessed stepped portion 33. In this embodiment, the leg insertion holes 32 are each formed as a cutaway portion opened from the bottom portion of the recessed stepped portion 33 and the lower edge of the guide lug 34. Naturally, the shape of the recessed stepped portions 33 and the guide lugs 34, and the formation method of the leg insertion holes 32 are not limited to the mentioned configuration.

In this embodiment, the recessed stepped portions 33 each include engaging slots 35 formed in the bottom portion so as to be engaged with positioning projections 45 (described later) of the leg member 40. As shown in FIG. 3, a pair of engaging slots 35 are vertically aligned with a spacing therebetween, in a region closer to the center of the retainer (inflator opening 31a) than the leg insertion hole 32 in the bottom portion of the recessed stepped portion 33. Naturally, the number and location of the engaging slots 35 are not limited to the mentioned configuration.

In this embodiment, airbag unit-side contacts (movable contacts) 11 that constitute the switch of the electric circuit are respectively provided in the left and right end portion and the lower end portion of the main plate portion 31, on the face thereof opposite to the driver so as to oppose the steering wheel-side contacts 10. Naturally, the number and location of the airbag unit-side contacts 11 are not limited to the mentioned configuration.

In this embodiment, an end portion of each of the coil springs 60b is attached to the face of the main plate portion 31 opposite to the driver. When the airbag unit 20 is mounted on the driver-side face of the steering hub portion 2, the other end portion of the coil spring 60 is abutted to the driver-side face of the steering hub portion 2 as shown in FIGS. 4 to 6, to accumulate a force (be compressed) so as to bias the retainer 30 toward the driver. Naturally, the location of the coil springs 60 is not limited to the mentioned configuration. The coil springs 60 may be attached to the steering hub portion 2. In addition, the biasing member is not limited to the coil spring.

In this embodiment, the leg members 40 each include a main leg portion 41 inserted through the leg insertion hole 32 and projecting from the retainer 30 in the direction away from the driver, a flange-shaped stopper portion 42 laterally protruding from a base portion (on the side of the driver) of the main leg portion 41 along the projecting direction (hereinafter, simply "base portion"), and a pair of guide plates 43, 44 protruding toward the driver from the base portion of the main leg portion 41.

In this embodiment, when the airbag unit 20 is mounted on the driver-side face of the steering hub portion 2, the main leg portion 41 of each of the leg members 40 is located so as to overlap the surface of the corresponding bracket 6 on the side of the center of the steering wheel, and the leading end portion (opposite to the driver) of the main leg portion 41 in the projecting direction (hereinafter, simply "end portion") is fitted in the corresponding leg member fitting groove 9, as shown in FIGS. 4 to 6. The main leg portions 41 each include a bolt orifice 41a formed at the position corresponding to the bolt orifice 6a of the bracket 6.

The leg members 40 each include a pair of guide lugs 41b respectively projecting from the upper and lower end portions of the main leg portion 41, toward the outer periphery of the steering wheel (toward the ring portion 4). The guide lugs 41b are formed generally parallel to the axial center line of the steering wheel 1. When the airbag unit 20 is mounted on the driver-side face of the steering hub portion 2 and the main leg portions 41 are set to overlap the surface of the respective brackets 6 on the side of the center of the steering wheel, the brackets 6 intrude between the respective pairs of guide lugs 41b, 41b, and the guide lugs 41b, 41b overlap the upper and lower end faces of the bracket 6. Thus, the leg members 40 are securely positioned with respect to the respective brackets 6.

The stopper portion 42 of the leg member 40 is located on the driver-side face of the retainer 30, and the retainer 30 is pressed by the coil springs 60 and abutted to the surface of the stopper portion 42 opposite to the driver as shown in FIG. 4, while the airbag unit 20 is free from a pressure from the side of the driver. Accordingly, the clearance between the retainer 30 and the steering hub portion 2 is delimited. In this embodiment, the stopper portions 42 protrude toward the center of the steering wheel, from the main leg portion 41. As shown in FIG. 2, reinforcing ribs 42a connecting the stopper portion 42 and the guide plate 43 are provided at the corner therebetween.

In this embodiment, the leg members 40 each include a pair of positioning projections 45 protruding from the stopper portion 42 in the direction away from the driver. When the retainer 30 is in contact with the surface of the stopper portion 42 opposite to the driver, the positioning projections 45 are engaged with the respective engaging slots 35 of the retainer 30. In this embodiment, the pair of positioning projections 45 are vertically aligned with a spacing therebetween, on the surface of the stopper portion 42 opposite to the driver. Naturally, the location of the stopper portions 42, and the number and location of the positioning projections 45 provided on the stopper portion 42 are not limited to the mentioned configuration.

In this embodiment, the region between the guide plates 43 and 44 of each of the leg members 40 constitutes a wall portion fitting groove 46 in which the left or right lateral portion of the wall portion 23b of the module cover 23 is fitted. The guide plate 43 is opposed to the surface of the wall portion 23b on the side of the center of the steering wheel, and the guide plate 44 is opposed to the surface of the wall portion 23b on the side of the outer periphery of the steering wheel. As shown in FIGS. 4 and 5, when the airbag unit 20 is pressed from the side of the driver, the lateral portions of the wall portion 23b are displaced away from the driver along the wall portion fitting groove 46.

In this embodiment, a first positioning projection 47 is formed so as to protrude from the surface of the guide plate 43 opposed to the wall portion 23b toward the outer periphery of the steering wheel, and the first positioning projection 47 is engaged with a first positioning slot 23e formed in the lateral portion of the wall portion 23b. In addition, a second positioning projection 48 is formed so as to protrude downward from the lower end portion of the guide plate 43, and the second positioning projection 48 is engaged with a second positioning slot 23f formed in the lateral portion of the wall portion 23b. Upon engagement between the positioning projections 47, 48 and the positioning slots 23e, 23f, the leg members 40 are positioned with respect to the wall portion 23b.

In this embodiment, further, the first positioning projection 47 has a tapered shape in which the width, taken in the direction orthogonal to the projecting direction from the guide plate 43 and the direction from the driver toward the opposite side of the driver, becomes narrower toward the opposite side of the driver. Likewise, the positioning slot 23e to be engaged with the projection 47 also has a tapered shape in which the width taken in a direction orthogonal to the direction from the driver toward the opposite side of the driver becomes narrower toward the opposite side of the driver. While the module cover 23 is free from the pressure from the side of the driver, the tapered portion of the projection 47 opposite to the driver is engaged with the tapered edge of the slot 23e opposite to the driver, because of the biasing force of the coil springs 60. When the module cover 23 is pressed from the side of the driver, the projection 47 is separated from the tapered edge of the slot 23e and a gap is formed therebetween, and therefore the module cover 23 can smoothly move away from the driver even when the module cover 23 is pressed slightly obliquely. Further, even though the projection 47 is shifted in the width direction in the slot 23e when the module cover 23 is pressed from the side of the driver, the tapered portion of the projection 47 opposite to the driver is pressed against the tapered edge of the slot 23e opposite to the driver when the module cover 23 is released from the pressure and returns to the initial position because of the biasing force of the coil springs 60. Such a configuration further ensures that the module cover 23 returns to a predetermined position, where the farthest end of the projection 47 opposite to the driver is fitted in the deepest position of the slot 23e opposite to the driver. Consequently, the positioning accuracy of the module cover 23 with respect to the steering wheel 1 in the state where the module cover 23 is free from a pressure can be further upgraded. Such a positioning structure for the module cover 23 becomes more advantageous in the case where the module cover 23 is made also applicable to a steering wheel without an airbag unit.

To assemble the airbag unit 20, a gas ejector 22a at the front end of the inflator 22 is inserted in the inflator opening 31a of the retainer 30, and the flange 22b of the inflator 22 is superposed on the surface of the main plate portion 31 of the retainer 30 opposite to the driver. On the driver side of the main plate portion 31, a gas inlet 21a of the airbag 21 located opposite to the driver is superposed on the periphery of the inflator opening 31a, and then a pressure ring 24 is superposed on the periphery of the gas inlet 21a from an inner side of the airbag 21. Then a stud bolt (not shown) of the pressure ring 24 is inserted through a bolt orifice (not shown) in the periphery of the gas inlet 21a of the airbag 21, the bolt orifice 31b of the retainer 30, and a bolt orifice (not shown) in the flange 22 of the inflator 22, and a nut (not shown) is fastened on the stud bolt. The airbag 21 and the inflator 22 are thus fixed to the retainer 30. Thereafter, the module cover 23 is attached to the front face of the retainer 30 so as to cover the folded body of the airbag 21, and the module cover 23 is connected and fixed to the retainer 30 as described above. At this point, the assembly of the airbag unit 20 is completed. Naturally, the assembly process of the airbag unit 20 and the fixing structure of the airbag 21 and the inflator 22 to the retainer 30 are not limited to the mentioned configuration.

<Mounting of Airbag Unit 20 on Steering Wheel 1>

To mount the airbag unit 20 on the steering wheel 1, the airbag unit 20 is placed on the driver-side face of the steering hub portion 2, and the main leg portion 41 of the leg member 40 is superposed on the surface of the bracket 6 on the side of the center of the steering wheel, by inserting the bracket 6 between the pair of guide lugs 41b, 41b of the leg member 40, so that the end portion of the main leg portion 41 is engaged with the corresponding leg member fitting groove 9. Then the leg members 40 are connected to the respective brackets 6 with the bolt 7 and the nut 8 via the bolt orifices 6a, 41a. The mounting of the airbag unit 20 on the steering wheel 1 is thus completed.

In the steering wheel 1 with the airbag unit 20, when the airbag unit 20 is pressed from the side of the driver, the leg members 40 are relatively displaced toward the driver with respect to the retainer 30 as shown in FIG. 5, so that the entirety of the airbag unit 20 except for the leg members 40 (hereinafter, simply "entirety of the airbag unit 20") is displaced away from the driver. Accordingly, the airbag unit-side contact 11 is brought into contact with the steering wheel-side contact 10 and hence the switch of the electric circuit is closed. When the airbag unit 20 is released from the pressure, the entirety of the airbag unit 20 moves toward the driver because of the biasing force of the coil springs 60, and therefore the contacts 10, 11 are separated from each other and the switch of the electric circuit is opened. When the entirety of the airbag unit 20 moves toward the driver by a predetermined distance, the retainer 30 is abutted to the stopper portion 42 of each of the leg members 40, and therefore the airbag unit 20 stops moving toward the driver.

In case of emergency such as a collision of vehicles, the inflator 22 of the airbag unit 20 is activated and the airbag 21 is expanded by the gas from the inflator 22. The airbag 21 explodes the main surface portion 23a of the module cover 23 and is unfolded between the steering wheel 1 and the driver. At this point, the retainer 30 is subjected to a load of the airbag 21 attracting the retainer 30 toward the driver, however since the stopper portion 42 of each of the leg members 40 is engaged with the retainer 30 from the side of the driver, the retainer 30 is securely held onto the steering wheel 1 by the leg members 40.

<Advantageous Effects of Embodiment>

In the mounting structure of the airbag unit 20, the leg members 40 themselves, projecting from the retainer 30 in the direction away from the driver and connected to the brackets 6 of the steering wheel 1, are displaced away from and toward the driver with respect to the retainer 30. Accordingly, the airbag unit 20 can be mounted on the steering wheel 1 so as to move toward and away from the driver, simply by connecting the leg members 40 directly to the brackets 6 of the steering wheel 1. Such a configuration eliminates the need to connect, as in the conventional technique, the airbag unit 20 to the base plate so as to move toward and away from the driver via the guide shaft, and to attach the base plate to the steering wheel, thereby simplifying the mounting structure of the airbag unit 20 on the steering wheel 1, thus contributing to facilitating the work and reducing the work time for mounting the airbag unit 20 on the steering wheel 1.

Further, the foregoing configuration also simplifies the structure of the steering wheel 1 with the airbag unit 20.

In this embodiment, the retainer 30 includes the leg insertion holes 32, through each of which the leg member 40 is inserted so as to move away from and toward the driver. With such a simple configuration, the leg member 40 can move away from and toward the driver with respect to the retainer 30.

In this embodiment, the leg members 40 each include a flange-shaped stopper portion 42 laterally protruding from the base portion of the main leg portion 41 inserted through the leg insertion hole 32, and the retainer 30 is pressed by the coil springs 60 and abutted to the surface of the stopper portion 42 opposite to the driver, while the airbag unit 20 is free from a pressure from the side of the driver. Accordingly, the distance between the airbag unit 20 and the steering wheel 1 in the state where the airbag unit 20 is free from a pressure can be securely delimited with a simple structure. In addition, although the retainer 30 is subjected to a load of the airbag 21 attracting the retainer 30 toward the driver when the airbag 21 is expanded, the leg members 40 securely keeps the retainer 30 on the steering wheel 1.

In this embodiment, the leg members 40 each include the pair of guide plates 43, 44 projecting toward the driver from the base portion of the main leg portion 41, and the guide plates 43, 44 are disposed to overlap the wall portion 23b of the module cover 23. Therefore, when the airbag 21 is expanded the wall portion 23b firmly withstands the pressure from the airbag 21, because of being supported by the guide plates 43, 44, and is prevented from being deformed by the pressure of the airbag 21 and from allowing the airbag 21 from improperly expanding from a position opposite to the driver to a lateral region of the wall portion 23b. Further, since the guide plates 43, 44 are disposed so as to hold the wall portion 23b therebetween, the wall portion 23b is positioned with higher accuracy by the guide plates 43, 44. Therefore, connecting the leg members 40 to the brackets 6 allows the module cover 23 to be positioned with respect to the steering wheel 1 with higher accuracy via the leg members 40, and also allows the main surface portion 23a of the module cover 23 to be positioned with higher accuracy.

In this embodiment, the wall portion 23b of the module cover 23 includes the positioning slots 23e, 23f, and the positioning projections 47, 48 formed on the guide plate 43 are respectively fitted in the positioning slots 23e, 23f. Therefore, the leg members 40 can be positioned with respect to the wall portion 23b of the module cover 23 with higher accuracy.

The foregoing embodiment is merely an example of the present invention, and the present invention may be configured in different manners from the accompanying drawings.

Although the present invention has been described in details referring to a specific embodiment, it is obvious to those skilled in the art that various modifications may be made without departing from the scope and the spirit of the present invention. This application is based on Japanese Patent Application No. 2011-182747 filed on Aug. 24, 2011, the entire content of which is incorporated herein by reference.

The invention claimed is:

1. A mounting structure of a driver airbag unit comprising:
a steering wheel; and
the driver airbag unit attached to the steering wheel so as to move at least toward and away from a driver, said driver airbag unit including
an airbag including a folded body,
an inflator for expanding the airbag,
a retainer to which the airbag and the inflator are attached,
a module cover attached to a driver-side face of the retainer, so as to cover the folded body of the airbag,
a leg member projecting from the retainer in a direction away from the driver to connect to the steering wheel,
a biasing member arranged between the steering wheel and the retainer such that the retainer is biased toward the driver, and
an electric circuit operated when the driver airbag unit is pressed by the driver and displaced away from the driver,
wherein the retainer includes a leg insertion hole; and the leg member is formed separately from the retainer, and inserted from a side of the driver through the leg insertion hole formed in the retainer such that the retainer moves at least toward and away from the driver along the leg member,
the module cover includes a main surface portion covering a driver-side face of the folded body of the airbag; and a wall portion projecting from the main surface portion in the direction away from the driver, and
the leg member includes a pair of guide plates projecting toward the driver, and the wall portion is inserted between the pair of guide plates so as to move at least away from and toward the driver along the pair of guide plates.

2. The mounting structure of the driver airbag unit according to claim 1,
wherein the leg member includes a main leg portion inserted through the leg insertion hole; and a stopper portion protruding in a lateral direction from a face of the main leg portion on the side of the driver, and
the stopper portion restricts the retainer from moving farther away from the steering wheel, upon being abutted to the retainer from the side of the driver.

3. The mounting structure of the driver airbag unit according to claim 1,
wherein one of the pair of guide plates includes a positioning projection projecting toward another of the pair of guide plates,
the wall portion includes a positioning slot with which the positioning projection is engaged so as to move at least away from and toward the driver, and
the module cover is positioned with respect to the steering wheel when the positioning projection is engaged with an edge of the positioning slot opposite to the driver, while the module cover is free from a pressure from the side of the driver.

4. The mounting structure of the driver airbag unit according to claim 3,
wherein the positioning projection has a tapered shape in which a width in a direction orthogonal to a projecting direction of the positioning projection from the one of the pair of guide plates and a direction from the driver toward an opposite side of the driver becomes narrower toward the opposite side of the driver, and
the positioning slot has a tapered shape in which a width in the direction orthogonal to the projecting direction of the positioning projection from the one of the pair of guide plates and the direction from the driver toward the opposite side of the driver becomes narrower toward the opposite side of the driver.

5. The mounting structure of the driver airbag unit according to claim 1, wherein the steering wheel includes a steering wheel-side contact formed on an upper end portion thereof and the retainer includes airbag unit-side contact formed at a lower end portion thereof to face the steering wheel-side contact, and when the steering wheel-side contact contacts the airbag unit-side contact, the electric circuit is operated.

* * * * *